United States Patent
Wada et al.

(10) Patent No.: US 7,688,533 B2
(45) Date of Patent: Mar. 30, 2010

(54) DRIVE APPARATUS AND LENS DRIVE APPARATUS

(75) Inventors: Shigeru Wada, Kishiwada (JP); Nobuya Miki, Ibaraki (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 65 days.

(21) Appl. No.: 12/116,508

(22) Filed: May 7, 2008

(65) Prior Publication Data

US 2008/0282696 A1  Nov. 20, 2008

(30) Foreign Application Priority Data

May 15, 2007  (JP) ............... 2007-129155

(51) Int. Cl.
- G02B 7/02 (2006.01)
- C22F 1/00 (2006.01)
- F01B 29/10 (2006.01)
- H02N 10/00 (2006.01)

(52) U.S. Cl. ............ 359/823; 359/820; 60/527; 60/528; 310/300; 310/306; 310/307; 148/402; 337/140

(58) Field of Classification Search ........... 359/813, 359/814, 822, 823, 820; 60/527, 528; 310/300, 310/306, 307; 148/402; 337/140; 428/68, 428/116, 583, 593, 598, 600, 604, 614, 686; 335/78, 205, 220; 604/135, 187; 267/166; 396/132; 236/103; 454/152, 155

See application file for complete search history.

(56) References Cited

U.S. PATENT DOCUMENTS

| | | | | |
|---|---|---|---|---|
| 4,740,253 | A * | 4/1988 | Simpson et al. ......... | 428/680 |
| 4,806,815 | A * | 2/1989 | Honma ................... | 310/307 |
| 4,998,688 | A * | 3/1991 | Longerich et al. ....... | 244/3.16 |
| 5,061,914 | A * | 10/1991 | Busch et al. ............. | 337/140 |
| 5,190,546 | A * | 3/1993 | Jervis ..................... | 606/78 |
| 5,371,753 | A * | 12/1994 | Adsett .................... | 372/36 |
| 5,419,788 | A * | 5/1995 | Thoma et al. ............ | 148/402 |
| 5,821,664 | A * | 10/1998 | Shahinpoor ............. | 310/307 |
| 6,239,686 | B1 * | 5/2001 | Eder et al. ............... | 337/382 |
| 6,546,806 | B1 * | 4/2003 | Varma .................... | 73/775 |
| 6,596,102 | B2 * | 7/2003 | Homma ................. | 148/561 |
| 6,691,977 | B2 * | 2/2004 | Knebel et al. ........... | 251/11 |
| 6,766,566 | B2 * | 7/2004 | Cheng et al. ............ | 24/452 |
| 6,972,659 | B2 * | 12/2005 | von Behrens et al. ... | 337/139 |
| 6,981,374 | B2 * | 1/2006 | von Behrens et al. ... | 60/527 |

(Continued)

FOREIGN PATENT DOCUMENTS

JP  2005-337262 1  12/2005

*Primary Examiner*—Loha Ben
(74) *Attorney, Agent, or Firm*—Sidley Austin LLP (57) ABSTRACT

A drive apparatus having: a shape memory alloy having a property such that a temperature transformation sensitivity in a temperature range from a starting point of austenite transformation (As) at a predetermined stress to an end point of austenite (Af) is higher than a temperature transformation sensitivity in other temperature range, and a temperature transformation sensitivity in a temperature range from a starting point of martensite transformation (Ms) at a predetermined stress to an end point of martensite transformation (Mf) is higher than a temperature transformation sensitivity in other temperature range; and a driven member which is moved by a transformation of the shape memory alloy; wherein the driven member is moved in a temperature range of higher temperature transformation sensitivity.

10 Claims, 6 Drawing Sheets

U.S. PATENT DOCUMENTS 7,032,282 B2 * 4/2006 Powell et al. .............. 29/426.4
7,146,690 B2 * 12/2006 Stanford et al. ............... 24/451
7,288,326 B2 * 10/2007 Elzey et al. ................ 428/593
7,393,595 B2 * 7/2008 Chandrasekaran et al. .. 428/614
7,597,616 B2 * 10/2009 Browne et al. .............. 454/155
7,614,228 B2 * 11/2009 Hamaguchi et al. ........... 60/527

* cited by examiner

DRIVE APPARATUS AND LENS DRIVE APPARATUS

This application is based on Japanese Patent Application No. 2007-129155 filed on May 15, 2007 in Japanese Patent Office, the entire content of which is hereby incorporated by reference.

TECHNICAL FIELD

The present invention relates to a drive apparatus and lens drive apparatus, particularly to a drive apparatus and lens drive apparatus using a shape memory alloy.

RELATED ART

In recent years, attempts have been made to use a shape memory alloy (hereinafter referred to as "SMA") in various forms of drive apparatuses. Even if the SMA has been deformed at a temperature lower than the transformation temperature, the SMA goes back to the original shape having been memorized when heated at a temperature higher than the transformation temperature. Such a drive apparatus takes advantage of this characteristic of the SMA. Normally, the SMA is made in the form of a string, and is expanded and contracted along the length by powered heat control, whereby the SMA can be used as an actuator.

In the meantime, the SMA is deformed only in the direction of returning to the memorized shape. Use of the SMA involves use of the other actuator that deforms the SMA in the direction opposite to the direction of returning to the original shape. Thus, in common practice, the SMA is utilized in combination with a spring for bias. When the SMA is combined with the low-priced spring without requiring control, and is made into the actuator, simplification and cost reduction of the apparatus can be achieved. Thus, study has been made to find out the possibility to applying the SMA to various forms of equipment has been studied.

For example, one of the techniques known in the conventional art is a lens drive apparatus including the SMA and spring that urge the lens support frame movably in the mutually opposite directions, wherein the generated force is changed by the powered control of the SMA so as to control the position wherein the generated force of the SMA and tension of the spring are kept in balance, whereby the lens support frame is moved to a predetermined position (Unexamined Japanese Patent Application Publication No. 2005-337262).

The equipment uses the SMA assumed to have an ideal property wherein the SMA exhibits a transformation close to linear deformation at a temperature higher than the reaction temperature (transformation temperature), without being deformed at all at a temperature lower than the reaction temperature. In actual practice, however, the SMA exhibits a minute deformation at a temperature lower than the reaction temperature, and the degree of deformation is increased as the temperature comes closer to the reaction temperature.

The lens drive apparatus disclosed in the Unexamined Japanese Patent Application Publication No. 2005-337262 fails to take into account the property of the SMA at a temperature lower than the reaction temperature. To be more specific, even at the normal temperature lower than the SMA reaction temperature, the SMA undergoes a minute deformation, with the result that the lens position is changed and cannot be kept at a fixed position. Thus, especially in the lens drive system wherein the amount of feed from the position of infinity used in the automatic focusing camera is controlled, the lens moves from the position of infinity and the image pickup range is narrowed. This gives a serious impact to the AF (Automatic Focusing) property.

The object of the present invention is to solve the problem, and to provide a drive apparatus and lens drive apparatus capable of high-precision positioning control of a driven member without being affected by the ambient temperature.

SUMMARY

To achieve the abovementioned object, a drive apparatus and a lens drive apparatus according to some aspects of the present invention are described in items 1-10.

1. A drive apparatus comprising: a shape memory alloy having a property such that a temperature transformation sensitivity in a temperature range from a starting point of austenite transformation (As) at a predetermined stress to an end point of austenite transformation (Af) is higher than a temperature transformation sensitivity in other temperature range, and a temperature transformation sensitivity in a temperature range from a starting point of martensite transformation (Ms) at a predetermined stress to an end point of martensite transformation (Mf) is higher than a temperature transformation sensitivity in other temperature range; and a driven member which is moved by a transformation of the shape memory alloy; wherein the driven member is moved in a temperature range of higher temperature transformation sensitivity.

2. The drive apparatus described in item 1, wherein a temperature range, within which the driven member is moved, is set above the starting point of austenite transformation (As) and below the end point of austenite transformation (Af) when heating the shape memory alloy, and is set below the starting point of martensite transformation (Ms) and above the end point of martensite transformation (Mf) when cooling the shape memory alloy.

3. A drive apparatus comprising: a shape memory alloy; a driven member which is moved by a transformation of the shape memory alloy; a regulation section for regulating a movement of the driven member; and an urging member which urges the driven member in a direction to the regulation section and gives stress to the shape memory alloy at the time of movement of the driven member; wherein a distortion rate of the shape memory alloy is set to be larger than a distortion rate of martensite phase under no stress condition and smaller than a distortion rate at an end point of martensite transformation under a stress at with which the driven member starts to be moved.

4. The drive apparatus described in item 3, wherein the shape memory alloy is an alloy comprised of titanium and nickel, and shaped in the form of a string, and wherein a stress of the shape memory alloy at the time of starting the movement of the driven member is set from 200 MPa to 400 MPa, and a stress of the shape memory alloy at a time before starting the movement of the driven member is set from 50 MPa to half the stress at the time of starting.

5. A lens drive apparatus having a shape memory alloy and a lens moved by a transformation of the shape memory alloy, the lens drive apparatus comprising; a regulation section for regulating a position of the lens to prevent the lens from being moved beyond a predetermined position in a transformation direction of the shape memory alloy; and an urging member which urges the lens in a direction to the regulation section and gives stress to the shape memory alloy at the time of movement in the direction of the regulation section; wherein the shape memory alloy is transformed by a power supply control thereto and, when the shape memory alloy is not supplied with power and is kept in contact with the regulation section by the urging member, a stress of the shape memory alloy is set in such a way that the distortion rate of the shape memory alloy at an end point of martensite transformation with a stress with respect to the load of an urging force by the urging member does not exceed a stress level corresponding to a distortion rate in the vicinity of 25° C., and the distortion rate of the shape memory alloy at an end point of austenite transformation is not less than a stress level corresponding to a distortion rate in the vicinity of 25° C.

6. The lens drive apparatus described in item 5, wherein the shape memory alloy is an alloy comprised of titanium and nickel, and the shape memory alloy is shaped in the form of a string, and wherein a stress of the shape memory alloy with respect to a load of the urging force by the urging member without the shape memory alloy being powered is set from 200 MPa to 400 MPa; and the stress of the shape memory alloy prior to the load being applied by the urging member is set from 50 MPa to 100 MPa.

7. A drive apparatus comprising: a shape memory alloy having a property such that, at a predetermined stress, the shape memory alloy transforms from martensite phase to austenite phase via a temperature transformation range by heating and goes back from austenite phase to martensite phase via the temperature transformation range by cooling, wherein the temperature transformation range is a temperature range within which a distortion rate of the shape memory alloy with respect to temperature change is large; and an urging member which provides a force to resist a deformation of the shape memory alloy when the shape memory alloy is heated; wherein a stress of the shape memory alloy is set such that the stress is increased by heating and the stress reaches a stress level at which the shape memory alloy starts deformation with resistance to the urging force by the urging member via a stage at which the stress of the shape memory alloy is increased without substantial deformation of the shape memory alloy.

8. A drive apparatus comprising: a shape memory alloy having a property such that, at a predetermined stress, the shape memory alloy transforms from martensite phase to austenite phase via a temperature transformation range by heating and goes back from austenite phase to martensite phase via the temperature transformation range by cooling, wherein the temperature transformation range is a temperature range within which a distortion rate of the shape memory alloy with respect to temperature change is large; and an urging member which provides a force to resist a deformation of the shape memory alloy when the shape memory alloy is heated; wherein a stress of the shape memory alloy is set such that the shape memory alloy deforms with resistance to the force provided by the urging member when cooling, the deformation of the shape memory alloy within the temperature transformation range becomes substantially zero, and the stress of the shape memory alloy decreases without deformation of the shape memory alloy while cooling down to the martensite phase.

9. A drive apparatus comprising: a shape memory alloy; a driven member which is moved by a deformation of the shape memory alloy; an urging member which provides the driven member with a force in a direction opposite to a deformation direction when heating and provides the shape memory alloy with a stress when the driven member is moved; and a regulating member for regulating a movement of the driven member not to exceed a predetermined position; wherein a position of the regulating member is set such that a stress of the shape memory alloy caused by the urging member is decreased before a movement of the driven member and that a temperature at which the driven member starts moving by heating the shape memory alloy becomes higher than a temperature at which a austenite transformation starts under a stress of the time when the driven member starts moving.

10. A drive apparatus comprising: a shape memory alloy; a driven member which is moved by a deformation of the shape memory alloy; an urging member which provides the driven member with a force in a direction opposite to a deformation direction when heating and provides the shape memory alloy with a stress when the driven member is moved; and a regulating member for regulating a movement of the driven member not to exceed a predetermined position; wherein a position of the regulating member is set such that a stress of the shape memory alloy caused by the urging member is decreased before a movement of the driven member and that a temperature at which the driven member reaches a position to contact the regulating member when the shape memory alloy cools becomes higher than a temperature at which a martensite transformation ends under a stress of the time before the driven member reaches the position to contact the regulating member.

DESCRIPTION OF THE PREFERRED EMBODIMENTS

Referring to drawings, the following describes the embodiments of the drive apparatus and lens drive apparatus of the present invention: It should be noted that, although it is described with reference to the illustrated embodiments, the present invention is not restricted thereto.

Embodiment 1

Figure 1:
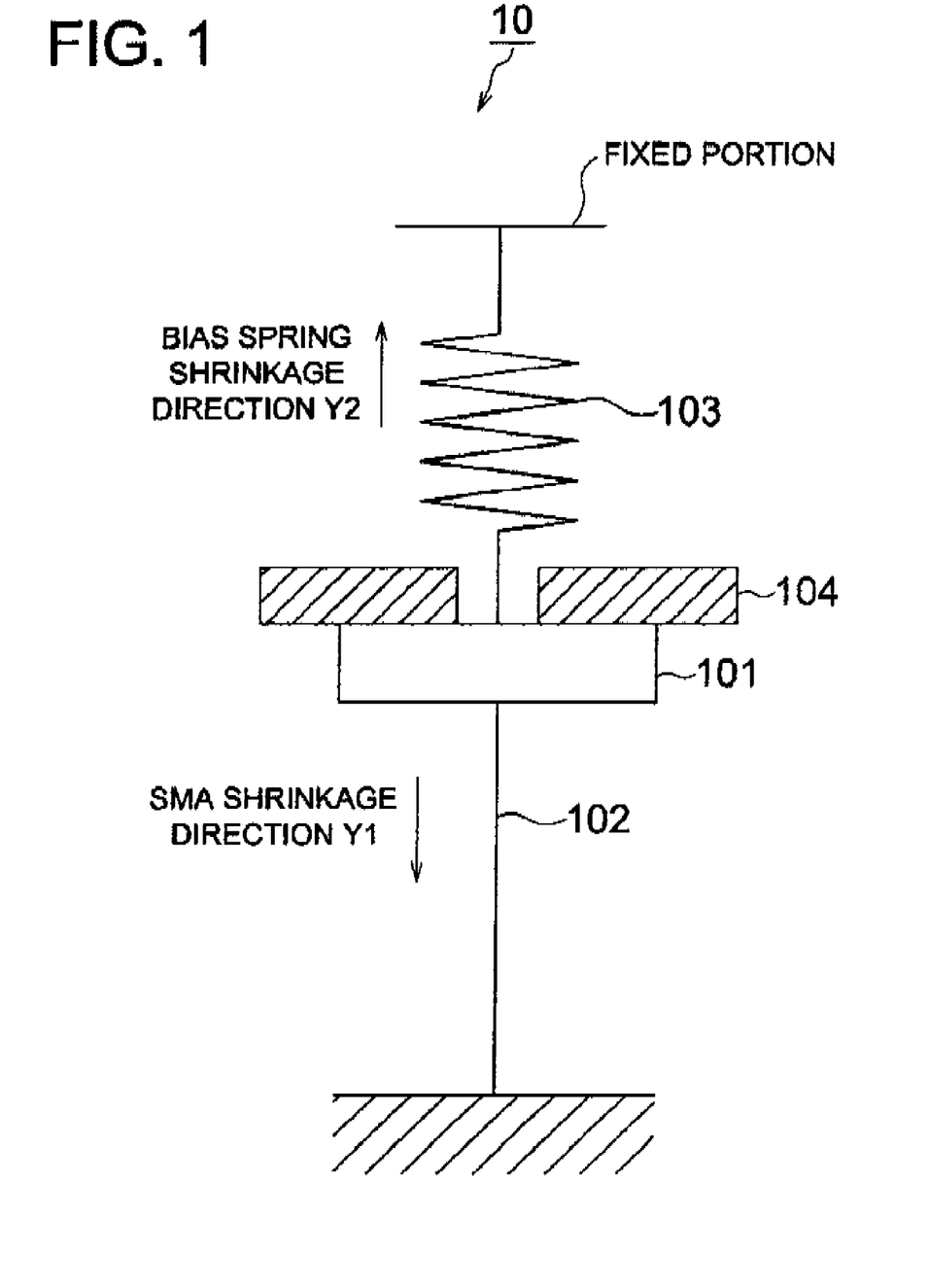
FIG. 1 is a schematic diagram representing major components of the drive apparatus as a first embodiment of the present invention.

In the first place, the major components of the drive apparatus as a first embodiment will be described with reference to FIG. 1. FIG. 1 is a schematic diagram representing major components of the drive apparatus 10 as a first embodiment.

As shown in FIG. 1, the drive apparatus 10 includes:

an SMA 102 that shrinks in a predetermined direction (in the arrow-marked direction Y1) by an abrupt reaction in response to a predetermined temperature;

a bias spring 103 corresponding to the urging member of the present invention, for producing a load in the direction opposite to the shrinkage direction of the SMA 102 (in the arrow-marked direction Y2);

a driven member 101 which, receiving the forces generated by both the SMA 102 and bias spring 103, is moved wherein there is a balance between both forces;

a drive circuit (not illustrated) for providing powered control of the SMA 102; and a stopper 104 corresponding to the regulation section of the present invention, for regulating the movement of the driven member 101 pulled by the bias spring 103 when the SMA 102 is not powered.

The reaction temperature of the SMA 102 is set at a level higher the temperature range under operating conditions. The temperature of the SMA 102 is controlled by the Joule heat of itself when powered. Under the operating conditions, the SMA 102 is superelastic and is elongated under a light load. The driven member 101 is pressed against the stopper 104 by the tension of the bias spring 103. The tension of the bias spring 103 is smaller than the permissible stress of the SMA 102, but is set at a relatively high level. The stress applied to the SMA 102 at a central temperature under the operating conditions is set below the level corresponding to the tension of the bias spring 103.

Figure 2:
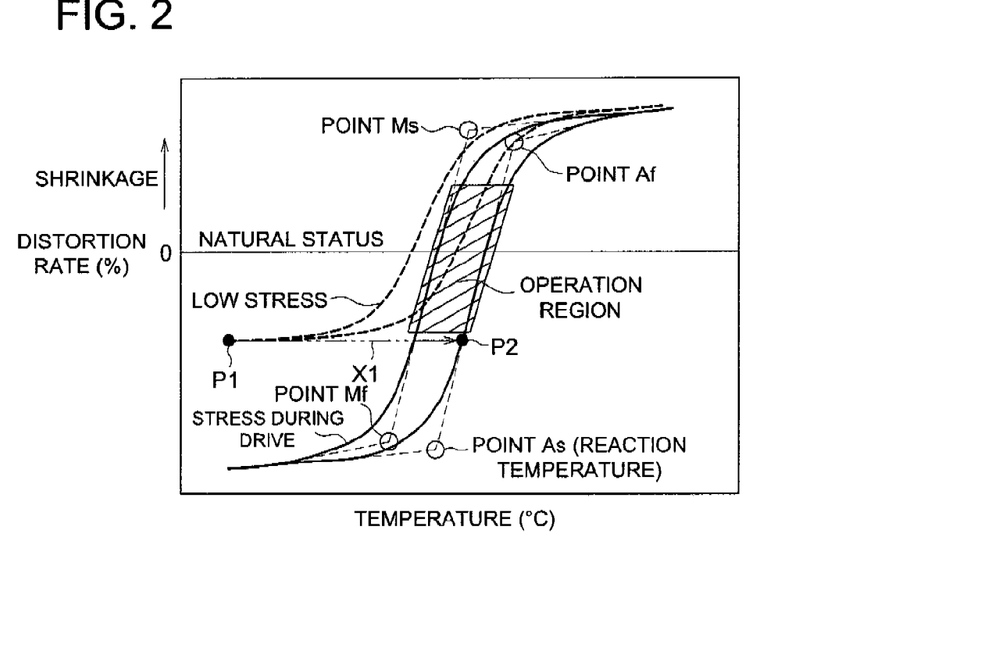
FIG. 2 is a diagram representing the relationship between the temperature and distortion rate of the SMA.

The following describes the stress set in the SMA 102 with reference to FIG. 2. FIG. 2 is a diagram representing the relationship between the SMA temperature and distortion rate.

As shown in FIG. 2, the SMA 102 contains: an austenite transformation starting point (point As) wherein an abrupt reaction staffs in response to heating; an austenite transformation finishing point (point Af) that staffs an abrupt reaction in response to heating, wherein the reaction is deteriorated at a higher temperature; a martensite transformation starting point (point Ms) wherein an abrupt reverse reaction staffs by cooling after memorized status has been reached by saturation of reaction; and a martensite transformation finishing point (point Mf) characterized by a change from an abrupt reverse reaction to a slow reverse reaction. The relationship between the temperature and distortion rate of the SMA 102 exhibits hysteresis, and the temperature is higher at point As than at point Mf, although the distortion rates are approximate to each other (wherein that of the point Mf is slightly greater). Similarly, the temperature is higher at point Af than at point Ms, although the distortion rates are approximate to each other (wherein that of the point Ms is slightly greater).

Switching at a sharp angle is ideal at the reaction switching points (points As, Af, Ms and Mf). Even the SMA made of a titanium-nickel alloy or a titanium-nickel-copper alloy characterized by abrupt switching exhibits a gradual reaction. As shown in FIG. 2, the reaction switching point is determined by the crossing point of the extension of the tangent in the region wherein linear reaction is observed.

Since the memorized status of the SMA is determined, the distortion rate depends on the initial stress applied to the SMA. If the initial stress is greater, the distortion rate can be increased. If the initial stress is smaller, the distortion rate is also smaller. Further, the reaction temperature is increased with the distortion rate.

The response to temperature differs according to where the distortion (stroke) required to drive the driven member 101 is used.

In the drive apparatus 10 of FIG. 1, the stress of the SMA 102 is balanced with the tension of the bias spring 103 during the drive. The relationship between the temperature and distortion rate shifts on the solid-line curve of FIG. 2, but when power is not supplied, this relationship is found at the left end P1 on the reaction curve (indicated by a broken line) in the low-stress mode. It should be noted that the stress in this case is set below the stress at point Mf. As the reaction progresses, the SMA 102 produces force in an attempt to go back to the memorized status. However, if the force is below the driving stress, only the stress is increased without the driven member 101 being moved (as shown by arrow X1). When the stress is increased in excess of the value wherein a balance with the tension of the bias spring 103 can be observed, the driven member 101 is moved. The balanced position corresponds to the position P2 of the initial set distortion on the reaction curve (indicated by a solid line) when drive stress is applied.

As in the conventional practice, when the driven member 101 is moved by the drive stress, the relationship between the SMA 102 and distortion rate shifts on the reaction curve (indicated by a solid line), and is therefore affected by the temperature change in the low-reaction region below the point As or Mf. In the present invention, however, the stress applied to the SMA 102 at the central temperature under operating conditions is set below the level of the stress applied to the tension of the bias spring 103. The relationship between the temperature and distortion rate when power is not applied is found at the left end P1 on the reaction curve (broken line) in the low-stress mode. This arrangement avoids the problem. To be more specific, the reaction caused by the temperature change in the low-reaction region can be regulated, and the possible tremor of the driven member 101 can be avoided.

Figure 3:
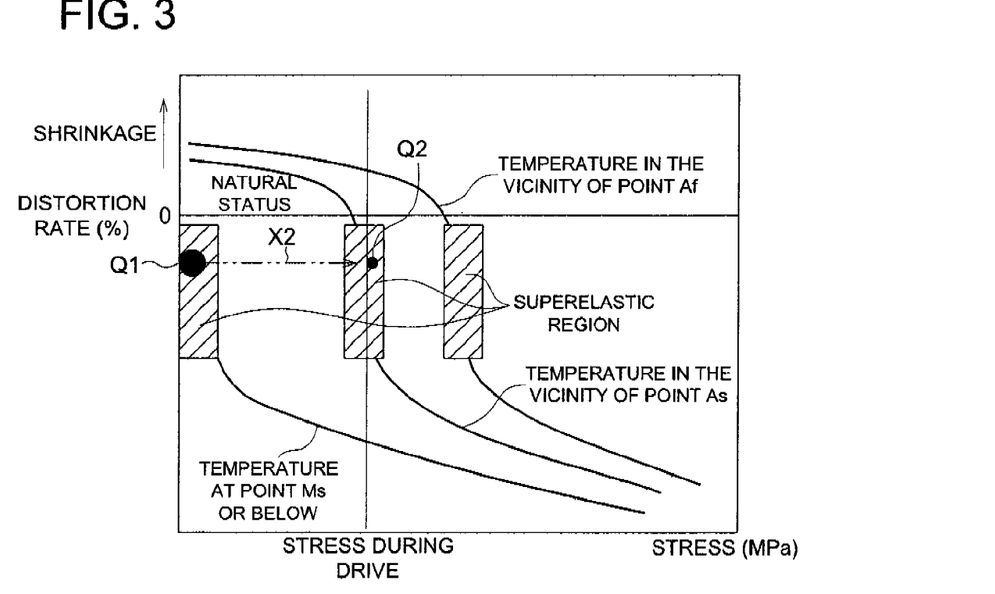
FIG. 3 is a diagram representing the relationship between the stress and distortion rate of the SMA.

Referring to FIG. 3, the following describes the status change of the SMA 102. FIG. 3 is a diagram representing the relationship between the stress and distortion rate of the SMA 102.

When power is not applied, the SMA 102 at the status (point Q1) of a predetermined stress (a predetermined distortion) has its distortion suppressed by the bias spring 103 down to the drive stress. The stress is gradually increased by its own force to return to the memorized status (shown by arrows X2). When the stress (point Q2) balanced with the bias spring 103 has been attained, movement is started in the superelastic region of this stress without the stress being raised. In actual practice, the bias spring 103 is charged and the stress is increased gradually.

[Variation]

Figure 4:
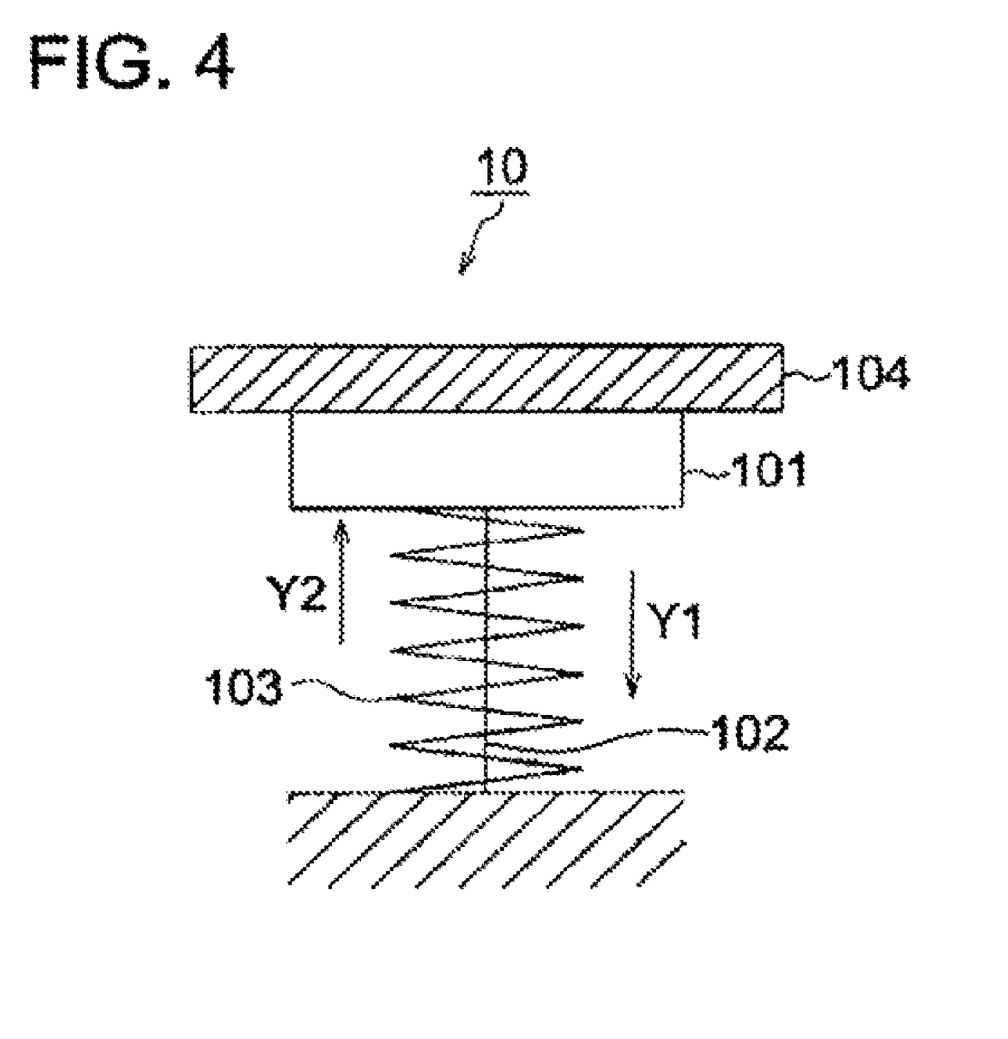
FIG. 4 is a schematic diagram representing the major components of the drive apparatus as a variation of the first embodiment.

FIG. 4 shows the components of the drive apparatus as a variation of the first embodiment. FIG. 4 is a schematic diagram representing the major components of the drive apparatus 10 as a variation of the first embodiment.

As shown in FIG. 4, the drive apparatus 10 uses a compressed coil spring as the bias spring 103, and presses the driven member 101 against the stopper 104. This arrangement provides the same advantages as those in the first embodiment.

Embodiment 2

Figure 5:
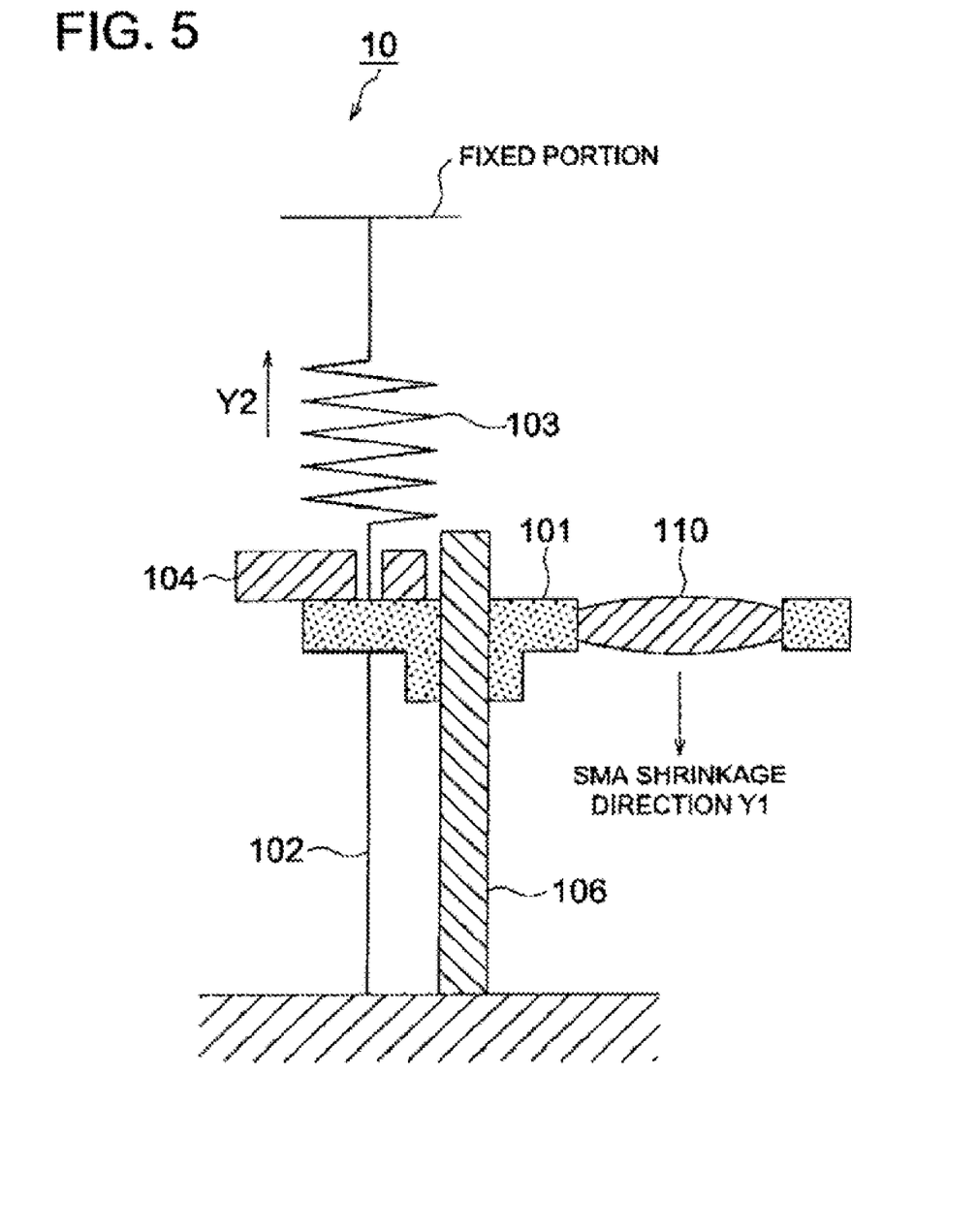
FIG. 5 is a schematic diagram representing the major components of the lens drive apparatus as a second embodiment of the present invention.

Referring to FIG. 5, the following describes the major components of the lens drive apparatus as a second embodiment. FIG. 5 is a schematic diagram representing the major components of the lens drive apparatus 10 as a second embodiment.

The lens drive apparatus 10 is a camera focus adjusting apparatus using the drive apparatus 10. The lens drive apparatus 10 moves the lens 110 to the focusing position according to the distance information provided by the distance measuring instrument (not illustrated).

The lens 110 is fixed on the driven member 101 supported by the movement guide 106. The position of infinity or over-infinity is where the driven member 101 is pressed against the stopper 104 by the bias spring 103. When the SMA 102 is supplied with power by a drive circuit (not illustrated), the stress of the SMA 102 is increased over the corresponding stress of the bias spring 103, and the lens 110 is driven along the movement guide 106 in the arrow-marked direction Y1.

According to the principle of the status change of the SMA 102 described with reference to the first embodiment, the lens 110 is kept at the low-reaction region, namely, within the operating temperature range, without being moved even slightly. This arrangement avoids possible adverse effect on the AF performance, without the image pickup area being reduced.

The SMA 102 used in the lens drive apparatus 10 is a shape memory alloy retaining a linear memory. The relationship among the stress σ, elongation ε, generated force F, and longitudinal elastic modulus E(T) as a temperature function in this case can be expressed by the following Formulae (1) and (2).

$$\sigma = C3 \cdot F \quad \text{(Formula 1)}$$

$$\epsilon = C4 \cdot \sigma / E(T) \quad \text{(Formula 2)}$$

wherein C3 and C4 denote the constants representing the sectional area and length of the SMA 102, respectively. The stroke of the SMA 102 is greater as the drive stress is greater, and exhibits asymptotic behavior toward a predetermined level as it approaches the permissible stress. When the SMA 102 is a titanium-nickel-copper alloy, the permissible stress σ max with consideration given to repeated durability is preferably 400 MPa and the drive stress is preferably set in the range of 200 through 400 MPa. The distortion of the points As and Mf in this case corresponds to the level from 100 MPa through 200 MPa prior to temperature rise. If the initial setting stress is set below this level, the lens 110 is not detached from the stopper 104 as the position of over-infinity even if the temperature has risen from the normal level to a high level (e.g. 60° C.). However, when the level is below 50 MPa, setting is difficult, and the stroke up to the memorized length (about half the 200 MPa) cannot be ensured. Further, this is not preferred for the focus adjusting apparatus because of reduction in the reaction speed and others.

Figure 8:
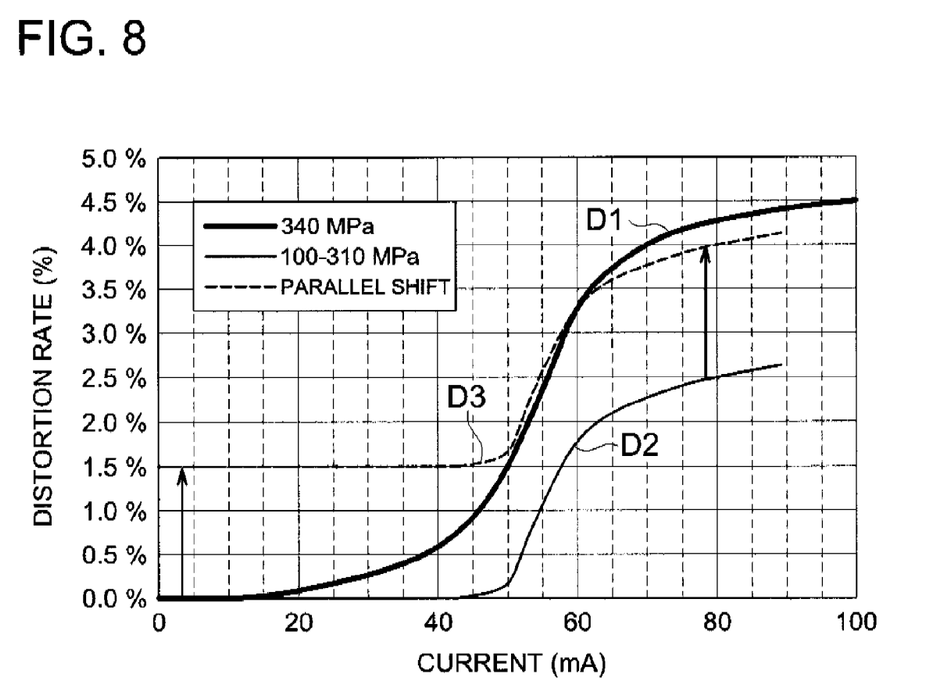
FIG. 8 is a chaff representing the relationship between the drive current and distortion rate of the SMA due to the difference in the initial setting stress.

The chart of FIG. 8 shows the test data on the relationship between the drive current and distortion rate of the SMA 102 due to the difference in the initial setting stress. The curve D1 of FIG. 1 shows the relationship when the tension of the bias spring 103 (the drive stress of the SMA 102) is assumed as 340 MPa. The curve D2 represents the relationship when the tension of the bias spring 103 (drive stress of the SMA 102) is assumed as 310 MPa and the initial stress of the SMA 102 is assumed as 100 MPa. The test data shows the relationship between the drive current and distortion rate of the SMA 102. The drive current is approximately equivalent to the temperature, and 40 mA corresponds to 70° C. when the ambient temperature is 25° C.

As indicated by the curve D2, when the initial stress of the SMA 102 is 100 MPa, a change in the distortion rate can be verified from where the current has exceeded about 40 mA. To be more specific, even if the temperature has risen from the normal temperature to a high level (e.g. 60° C.), the lens 110 is not detached from the stopper 104 representing the position of over-infinity.

The difference of about 1.5% in distortion rate between the curves D1 and D2 in the vertical axis represents the difference between the length when the SMA 102 is strung at 340 MPa from the memorized length and that when strung at 100 MPa. The curve D3 resulting from parallel movement of the curve D2 in the positive direction of vertical axis corresponds approximately to the curve D4.

[Variation 1]

Figure 6:
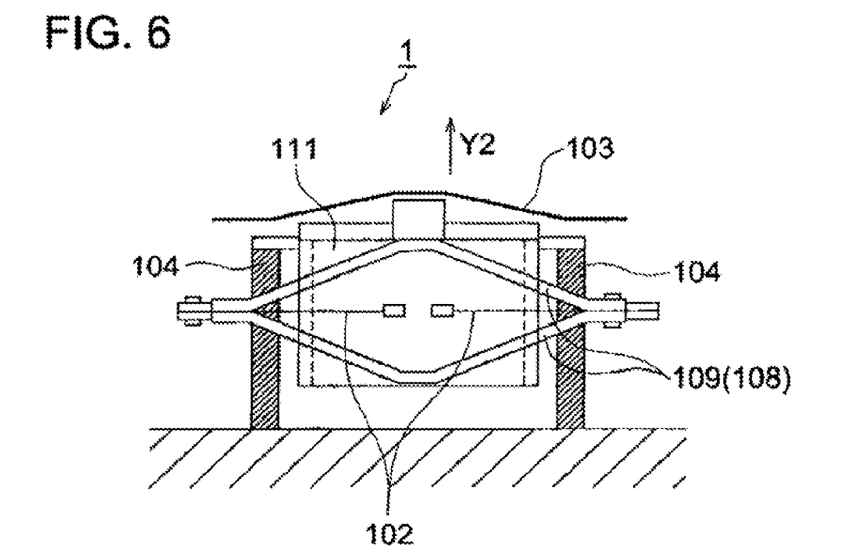
FIG. 6 is a schematic diagram representing the major components of the lens drive apparatus as a first variation of the second embodiment.

FIG. 6 shows the major components of the lens drive apparatus 1 as a first variation of the second embodiment. FIG. 6 is a schematic diagram representing the major components of the lens drive apparatus 1 as a first variation of the second embodiment.

The lens drive apparatus 1 is a camera focus adjusting apparatus, similarly to the case of the second embodiment.

The SMA 102 is installed on two drive arms 109 provided on the pantograph 108.

The stroke by deformation of the SMA 102 is transmitted to the lens body tube enlarged through the pantograph 108. A plate spring is used as the bias spring 103 and the SMA 102 is pulled in the direction perpendicular to the optical axis by the bias spring 103, whereby the greater amount of displacement is ensured for the smaller height of the lens drive apparatus 1. Further, the generated force of the bias spring 103 can be set at a smaller level by the power variation rate of the pantograph 108. This structure promotes downsizing of the lens system. The SMA 102 is powered by the drive circuit (not illustrated). When the stress of the SMA 102 has been increased over the corresponding stress of the bias spring 103, the SMA 102 shrinks, whereby the two drive arms 109 expand in the vertical direction. This procedure allows the lens body tube 111 to be extended in the arrow-marked direction Y2 along the movement guide (not illustrated). This structure provides the same advantages as those of the second embodiment.

[Variation 2]

Figure 7:
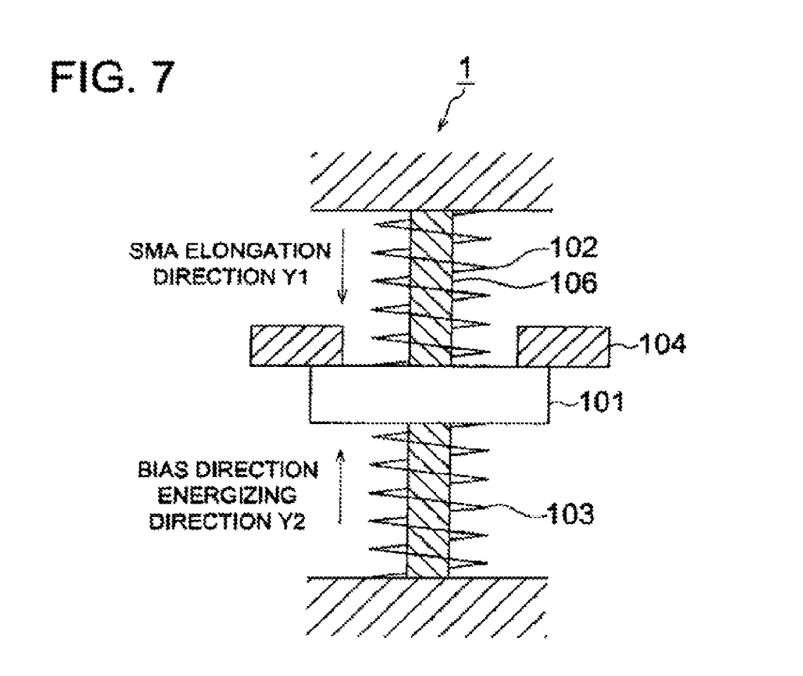
FIG. 7 is a schematic diagram representing the major components of the lens drive apparatus as a second variation of the second embodiment.

FIG. 7 shows the major components of the lens drive apparatus 1 as a second variation of the second embodiment. FIG. 7 is a schematic diagram representing the major components of the lens drive apparatus as a second variation of the second embodiment.

Similarly to the case of the second embodiment, the lens drive apparatus 1 is a camera focus adjusting apparatus. A shape memory alloy coil spring is used as the SMA 102.

As shown in FIG. 7, the drive apparatus 1 includes:

an SMA 102 of coil spring structure that expands in a predetermined direction (in the arrow-marked direction Y1) by an abrupt reaction in response to a predetermined temperature;

a bias spring 103 for producing a load in the direction opposite to the expanding direction of the SMA 102 (in the arrow-marked direction Y2);

a driven member 101 which, receiving the forces generated by both the SMA 102 and bias spring 103, is moved wherein there is a balance between both forces;

a drive circuit (not illustrated) for providing powered control of the SMA 102; and a stopper 104 for regulating the movement of the driven member 101 pulled by the bias spring 103 when the SMA 102 is not powered.

The reaction temperature of the SMA 102 is set at a level higher the temperature range under operating conditions. The temperature of the SMA 102 is controlled by the Joule heat of itself when powered. Under the operating conditions, the SMA 102 is superelastic and is elongated under a light load. The driven member 101 is pressed against the stopper 104 by the force of the bias spring 103. The force of the bias spring 103 is smaller than the permissible stress of the SMA 102, but is set at a relatively high level. The stress applied to the SMA 102 at a central temperature under the operating conditions is set below the level corresponding to the tension of the bias spring 103.

The stress of the shape memory alloy coil spring is a shear stress. The relationship among shear stress τ, spring elongation λ, generated force W and transverse elastic modulus G (T) as temperature function can be expressed by the following Formulae (3) and (4).

$$\tau = C1 \cdot W \quad \text{(Formula 3)}$$

$$\lambda = C2 \cdot \tau / G(T) \quad \text{(Formula 4)}$$

wherein C1 and C2 denote the constant made up of the coil radius, number of turns and wire size. As can be seen by comparison between the Formulae 3 and 4, and Formulae 1 and 2 representing the relationship among the stress σ, elongation ε, generated force F, and longitudinal elastic modulus E(T) as a temperature function, both are approximately equivalent to each other. Thus, when the shape memory alloy coil spring is used as the SMA 102, the patter n of the status change of the SMA 102 is almost the same as that shown in FIGS. 2 and 3 in the first embodiment. This provides the same advantages as those in the first embodiment.

As described above, in the drive apparatus 10 and lens drive apparatus 1 as an embodiment of the present invention, when the SMA 102 is in the status of low reaction, the load of the bias spring 103 is received by the stopper 104 and the initial setting stress of the SMA 102 in this case is kept at a level lower than the operating stress (load stress). Thus, this structure ensures that there is no movement until a predetermined stress is reached, while regulating the length (amount of reaction) at the normal temperature (25° C.) of the SMA 102. This makes it possible to use only the stabilized reaction area in excess of the reaction temperature in the temperature distortion diagram.

To be more specific, the stress of the SMA 102 at the normal temperature is set to the level equal to or less than the stress wherein the distortion at the point As or Mf of the SMA 102 at the drive stress corresponds to the distortion of the total stroke, whereby the movement of the driven member 101 from the stopper can be prevented in the temperature range up to the high temperature. This ensures high-precision positioning of the driven member 101 without being affected by the ambient temperature.

The embodiment of the present invention allows the shape memory alloy to be operated only in the temperature range of high temperature transformation sensitivity. Thus, the unwanted reaction (deformation) of the shape memory alloy in the temperature range of low temperature transformation sensitivity can be prevented, and hence a desired operation is performed.

In the lens drive apparatus including a shape memory alloy and a lens moved by the deformation of the shape memory alloy, when the shape memory alloy is not powered and is kept in contact with the regulation section by the urging member, the stress of the shape memory alloy is set in such a way that the distortion rate of the shape memory alloy at the end point of martensite transformation at the stress with respect to the load of the urging force by the urging member does not exceed the stress level corresponding to the distortion rate in the vicinity of 25° C., and the distortion rate of the shape memory alloy at the end point of austenite transformation is not less than the distortion rate in the vicinity of 25° C.

To be more specific, when the shape memory alloy is in the status of low reaction, the load of the urging member is received by the regulation section and the initial setting stress of the shape memory alloy in this case is kept at a level lower than the operating stress (load stress). Thus, this structure ensures that there is no movement until a predetermined stress is reached, while regulating the length (amount of reaction) at the normal temperature (25° C.) of the shape memory alloy. This makes it possible to use only the stabilized reaction area in excess of the reaction temperature in the temperature distortion diagram, with the result that a high-precision control of positioning of the lens can be achieved without being affected by the ambient temperature.

What is claimed is:

1. A drive apparatus comprising:
   a shape memory alloy having a property such that a temperature transformation sensitivity in a temperature range from a starting point of austenite transformation (As) at a predetermined stress to an end point of austenite transformation (Af) is higher than a temperature transformation sensitivity in other temperature range, and a temperature transformation sensitivity in a temperature range from a starting point of martensite transformation (Ms) at a predetermined stress to an end point of martensite transformation (Mf) is higher than a temperature transformation sensitivity in other temperature range; and
   a driven member which is moved by a transformation of the shape memory alloy;
   wherein the driven member is moved in a temperature range of higher temperature transformation sensitivity.

2. The drive apparatus claimed in claim 1, wherein a temperature range, within which the driven member is moved, is set above the starting point of austenite transformation (As) and below the end point of austenite transformation (Af) when heating the shape memory alloy, and is set below the starting point of martensite transformation (Ms) and above the end point of martensite transformation (Mf) when cooling the shape memory alloy.

3. A drive apparatus comprising:
   a shape memory alloy;
   a driven member which is moved by a transformation of the shape memory alloy;
   a regulation section for regulating a movement of the driven member; and
   an urging member which urges the driven member in a direction to the regulation section and gives stress to the shape memory alloy at the time of movement of the driven member;
   wherein a distortion rate of the shape memory alloy is set to be larger than a distortion rate of martensite phase under no stress condition and smaller than a distortion rate at an end point of martensite transformation under a stress at which the driven member starts to be moved.

4. The drive apparatus claimed in claim 3, wherein the shape memory alloy is an alloy comprised of titanium and nickel, and shaped in the form of a string, and wherein a stress of the shape memory alloy at the time of starting the movement of the driven member is set from 200 MPa to 400 MPa, and a stress of the shape memory alloy at a time before starting the movement of the driven member is set from 50 MPa to half the stress at the time of starting.

5. A lens drive apparatus having a shape memory alloy and a lens moved by a transformation of the shape memory alloy, the lens drive apparatus comprising;
   a regulation section for regulating a position of the lens to prevent the lens from being moved beyond a predetermined position in a transformation direction of the shape memory alloy; and an urging member which urges the lens in a direction to the regulation section and gives stress to the shape memory alloy at the time of movement in the direction of the regulation section;

wherein the shape memory alloy is transformed by a power supply control thereto and, when the shape memory alloy is not supplied with power and is kept in contact with the regulation section by the urging member, a stress of the shape memory alloy is set in such a way that the distortion rate of the shape memory alloy at an end point of martensite transformation with a stress with respect to the load of an urging force by the urging member does not exceed a stress level corresponding to a distortion rate in the vicinity of 25° C., and the distortion rate of the shape memory alloy at an end point of austenite transformation is not less than a stress level corresponding to a distortion rate in the vicinity of 25° C.

6. The lens drive apparatus claimed in claim 5, wherein the shape memory alloy is an alloy comprised of titanium and nickel, and the shape memory alloy is shaped in the form of a string, and wherein a stress of the shape memory alloy with respect to a load of the urging force by the urging member without the shape memory alloy being powered is set from 200 MPa to 400 MPa; and the stress of the shape memory alloy prior to the load being applied by the urging member is set from 50 MPa to 100 MPa.

7. A drive apparatus comprising:
a shape memory alloy having a property such that, at a predetermined stress, the shape memory alloy transforms from martensite phase to austenite phase via a temperature transformation range by heating and goes back from austenite phase to martensite phase via the temperature transformation range by cooling, wherein the temperature transformation range is a temperature range within which a distortion rate of the shape memory alloy with respect to temperature change is large; and
an urging member which provides a force to resist a deformation of the shape memory alloy when the shape memory alloy is heated;
wherein a stress of the shape memory alloy is set such that the stress is increased by heating and the stress reaches a stress level at which the shape memory alloy starts deformation with resistance to the urging force by the urging member via a stage at which the stress of the shape memory alloy is increased without substantial deformation of the shape memory alloy.

8. A drive apparatus comprising:
a shape memory alloy having a property such that, at a predetermined stress, the shape memory alloy transforms from martensite phase to austenite phase via a temperature transformation range by heating and goes back from austenite phase to martensite phase via the temperature transformation range by cooling, wherein the temperature transformation range is a temperature range within which a distortion rate of the shape memory alloy with respect to temperature change is large; and
an urging member which provides a force to resist a deformation of the shape memory alloy when the shape memory alloy is heated;
wherein a stress of the shape memory alloy is set such that the shape memory alloy deforms with resistance to the force provided by the urging member when cooling, the deformation of the shape memory alloy within the temperature transformation range becomes substantially zero, and the stress of the shape memory alloy decreases without deformation of the shape memory alloy while cooling down to the martensite phase.

9. A drive apparatus comprising:
a shape memory alloy;
a driven member which is moved by a deformation of the shape memory alloy;
an urging member which provides the driven member with a force in a direction opposite to a deformation direction when heating and provides the shape memory alloy with a stress when the driven member is moved; and
a regulating member for regulating a movement of the driven member not to exceed a predetermined position;
wherein a position of the regulating member is set such that a stress of the shape memory alloy caused by the urging member is decreased before a movement of the driven member and that a temperature at which the driven member staffs moving by heating the shape memory alloy becomes higher than a temperature at which an austenite transformation starts under a stress of the time when the driven member starts moving.

10. A drive apparatus comprising:
a shape memory alloy;
a driven member which is moved by a deformation of the shape memory alloy;
an urging member which provides the driven member with a force in a direction opposite to a deformation direction when heating and provides the shape memory alloy with a stress when the driven member is moved; and
a regulating member for regulating a movement of the driven member not to exceed a predetermined position;
wherein a position of the regulating member is set such that a stress of the shape memory alloy caused by the urging member is decreased before a movement of the driven member and that a temperature at which the driven member reaches a position to contact the regulating member when the shape memory alloy cools becomes higher than a temperature at which a martensite transformation ends under a stress of the time before the driven member reaches the position to contact the regulating member.

* * * * *